Oct. 30, 1934.  H. P. GOVARE ET AL  1,979,195
CAM
Filed June 24, 1930
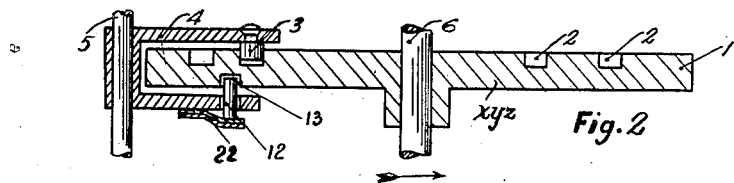
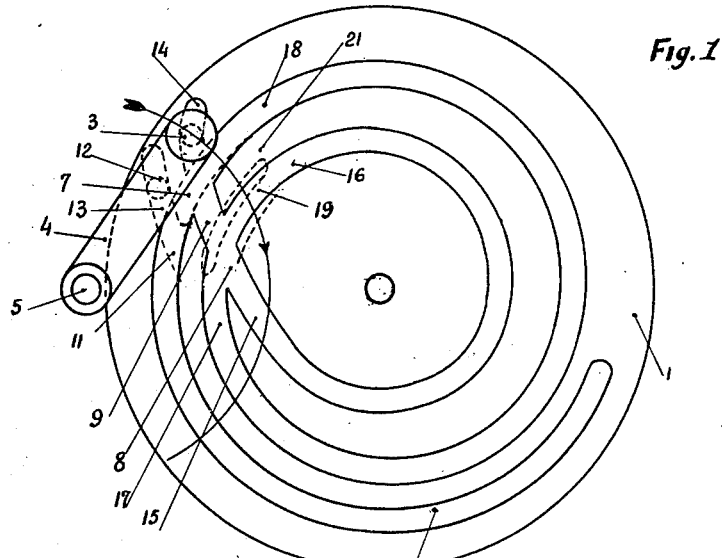
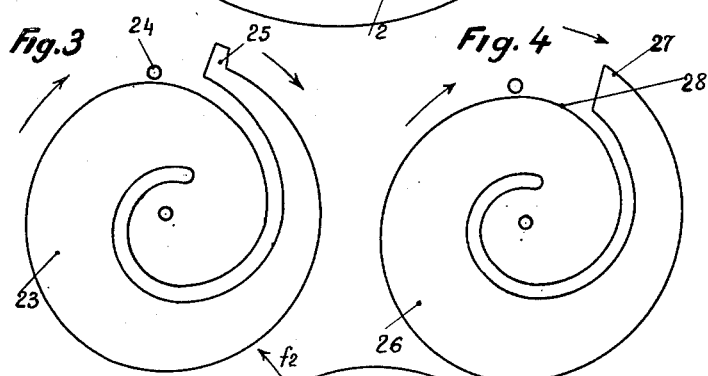
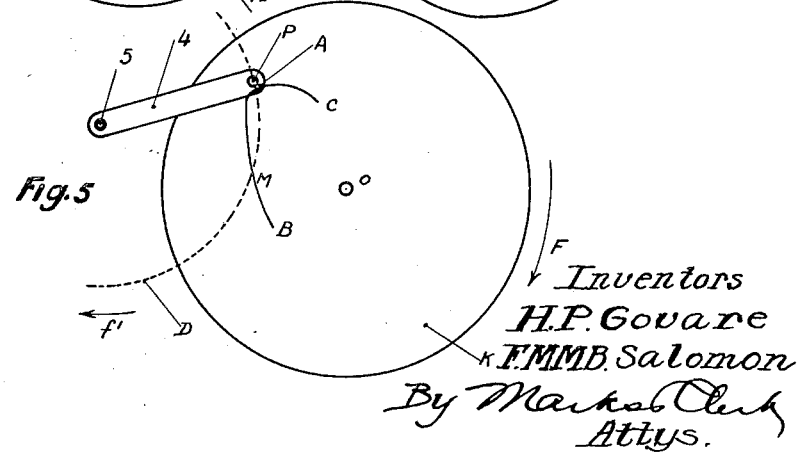
Inventors
H. P. Govare
F. M. M. B. Salomon
By Marks Clerk
Attys.

Patented Oct. 30, 1934

1,979,195

UNITED STATES PATENT OFFICE 1,979,195

CAM

Harry Paul Govare and François Marie Michel Bernard Salomon, Paris, France

Application June 24, 1930, Serial No. 463,518 In France June 29, 1929

11 Claims. (Cl. 74—55)

In so-called operator machines adapted to give out functions and in particular in mean speed indicators, it is necessary to provide cams which give the sliders accurate displacements in a wide field without their size becoming excessive thereby.

According to the function to be given out the motions of the slide should be more or less rapid; thus for a logarithmic function of the angle $x$ of rotation of the cam, for instance when it is desired to provide either the logarithm of this angle, or the number of which this angle measures the logarithm, the displacement of the slider should be for a same variation of $x$, be larger when $x$ is small than when it is considerable. The ratio between the angular displacement of the cam and the corresponding displacement of the slider depends on the vector radius $r$ of the slider path and on the angle V according to which it cuts it according to the formula $$\frac{dr}{dx} = \frac{r}{tgV}.$$

If this ratio is to be great, one is led either to increase $r$ or to diminish V, but this last solution is possible only within certain limits, as it might risk causing the parts to be wedged.

On the other hand it is of interest from an economical standpoint and from that of size to diminish the diameter of the cam and consequently to use its entire diameter, while not exaggerating the slopes for the reasons stated hereinabove and not using too close windings for the curved path of the slider as this might mean lacking space for housing the latter.

The object of the present invention is a cam satisfying these several conditions. It is characterized by the fact that if when giving out a given function, it is in succession attractive and repulsive or the slider path shows double points, one or more auxiliary sliders with one or more auxiliary guiding grooves are used for guiding the main slider in certain parts of its path such as the double points where it might take a wrong direction or else in those parts where its movement might risk being effected under bad conditions.

The following description and accompanying drawing show by way of example several forms of execution of the invention.

Fig. 1 is a plan view of a cam according to invention.

Fig. 2 shows the same in elevation.

Figs. 3 and 4 show arrangements relating to the end of the drive and allowing to do away with the usual disconnecting means.

Fig. 5 is a modification.

The cam (Fig. 1) comprises a circular plate 1, which may, if desired, be recessed and which rotates round its center. A groove 2 serving to guide the slider 3 is provided therein. The slider is carried by a strap 4 and may rotate round a spindle 5 parallel to the axis of rotation 6 of the cam so as to describe an arc of a circle. When the cam rotates round its axis, the slider 3 engaging the groove is thus driven by the latter and rotates round the axis 5, the movement of the slider depending on the movement of the cam and on the shape of the groove 2.

However, there are points where the slider may not pass into the desired direction; such are, for instance, the double points 7 and 8; at the former of these points 7, for instance, the slider may engage either the branch 9 or the branch 11 of the groove; there may also be parts of the cam where the drive is effected under bad conditions, which may occur for instance at the beginning of the cam path where the logarithmic movements are very rapid.

To avoid these drawbacks, the apparatus is provided with a second slider 12 integral with the first one, mounted for instance on the same strap and guided by grooves or projections on the cam provided for instance on the lower surface of the plate 1; this second slider describes on this surface a certain path the general shape of which is similar to that of the groove 2; the positions of the sliders 3 and 12 may be chosen in such a manner that they are not simultaneously in parts of their paths where the guiding is provided in an indefinite or ineffective manner whereby each slider acts in succession as a guide for the other; it is moreover unnecessary to draw entirely the groove serving as a path for the slider 12, as it would be a useless repetition of the groove 2. It is sufficient to draw it in those parts where it is useful for guiding the slider 3. Thus, in the case of the figure the groove portion 13 guides the slider 12 and consequently the strap 4 while the slider 2 coming from the groove branch 14 passes across the double points 7 and 8 through the branches 9 and 15; in its subsequent movement the slider 3 passes again through these double points; but it passes through the point 8 from the branch 16 to the branch 17 and through the point 7 from the branch 18 to the branch 11; it is guided at these moments by the auxiliary slider 12 engaging the groove portions 19 and 21.

Having thus described the general working, we will now proceed to give a further detailed account thereof: at the start, i. e. in the position illustrated the main slider 3 is in the groove 14 and its motion is not sufficiently reliable. At the same moment, the auxiliary slider 12 is in the auxiliary groove 13 and provides an accurate working from this moment onwards and until the main slider has passed the crossings 7 and 8.

On the other hand, when the slider 12 moving along the groove 13 arrives in front of the end of the auxiliary groove 21, the slider 3 is in the part of its path between the crossings 7 and 8 where it is perfectly guided; the strap is thus guided and the slider 12 cannot move out of its path in groove 13 for instance into groove 21. A little before the auxiliary slider passes out its groove 3, it ensures the proper guidance of the main slider 3 through the crossing 8 after which said main slider is perfectly guided in the grooves 15—16 while the auxiliary slider passes freely over the flat zones X, Y, Z on the under side of the cam until it engages the groove 19. At this moment the main slider 3 is about to pass through the crossing 8 where its guidance is ensured by the slider 12 held in its groove 19.

The slider 12 moves then out of the groove 19 and passes again over the free zones X, Y, Z while the strap is positively guided by the groove 18 wherein the main slider is held. When the main slider is about to pass again through the crossing 7, the slider 12 coming from the zone Z engages the groove 21. This provides a guidance for the strap while the slider 3 is passing through the crossing 7. After this the auxiliary slider escapes through the opening 30. The strap 4 is then guided up to the end of its path by the slide 3 moving in the groove 2.

The auxiliary slider may engage groove portions the extremities of the bottom of which merge into the lower surface of the plate, this slider 12 being then urged against the plate by a yielding device such as the spring 22. The slider 12 might also be secured in a permanent manner to the strap 4 and meet projecting guides secured to the underside of the plate 1.

In operator machines controlled by cams, for instance mean speed indicators, disconnecting devices are used which, when the apparatus is at the end of its path, disengage it from the driving parts so as to avoid any damage in case it were forgotten to bring the apparatus back to zero as this should be done.

Such disconnecting devices which are always intricate and consequently costly and subject to irregular working may be done away with by suitable arrangements of the cam itself.

When it is driven by a motor of small power, say a clockwork the device shown in Fig. 3 by way of example may be used; when the cam 23 supposed to be repulsive arrives at the end of its path, the slider 24 comes against a shoulder 25 which stops the movement.

If, on the contrary the motor driving the cam has a power which might in case of a compulsory stoppage be dangerous for the apparatus it is preferably to use the device shown in Fig. 4; when the cam 26 is at the end of its path, the slider arrives against the projection 27 and falls back along the slope 28 under the action of a spring not shown; the movement may continue indefinitely without any inconvenience for the mechanism; obviously from this moment onwards the indications given by the apparatus are wrong and it is necessary to set it back to zero as soon as the user is aware thereof.

The bevelled shape of the projection 27 furthers the proper guidance of the slider when the device is set back to zero.

A difficulty appearing more particularly in logarithmic speed indicators is the following: Supposing the unit of distance traveled over is say 30 kilometers and the unit of time elapsed 30 minutes, the apparatus being adapted to be operative after a half unit of distance has been traveled over and a half unit of time has elapsed, the apparatus when returned to zero will give out an indication corresponding to 15 kilometers and 15 minutes and which is consequently 60 kilometers per hour. This will be a cause of astonishment for the user when he sees such a figure when his car is still in the garage whereby the commercial interest of the indicator is considerably reduced.

We have provided means for removing this drawback without increasing the cost price of the apparatus.

The user when returning the apparatus to zero causes the distance cam to rotate in a direction opposed to that of the arrow of Fig. 2. The arrangement of the slopes or guiding means is such that the slider 3 is pushed towards the left up to a point corresponding to say 0,2 units or in the case considered 6 kilometers after which the slopes would be too steep for use.

On the other hand when the user returns to zero the cam corresponding to the time elapsed, he causes it to rotate backwards until it comes to a standstill; but a particular arrangement shown in Fig. 5 causes, when the time cam continues rotating backwards, the time slider carried by an arm such as arm 4 (Fig. 2) and describing a circle round 5 to move from a certain moment onwards, in the direction corresponding to increasing time. For instance, supposing still the time unit is 30 minutes, the apparatus is returned to zero in a normal manner until say 0,3 units i. e. 9 minutes. But if the user continues after this rotating the cam backwards, the arm 4 of Fig. 2 will move, from this moment onwards in the direction corresponding to increasing time.

This result may be obtained as shown in Fig. 5. The time cam K the center of which is at O is adapted to move normally in the direction of an arrow F under the action of a clockwork which causes the slider P to move in the direction of the arrow $f_1$ along the circle D having its centre at 5.

Reversely when the user returns the cam to zero, he makes the cam K rotate in a direction opposed to that of the arrow F.

But after the slider P has arrived at A, the branch AC of the cam K begins being operative and the user continuing to make the cam K rotate in the direction opposed to that of the arrow F, the slider P returns, owing to the shape given to the branch AC, some distance back in the direction of the arrow $f_1$.

For instance it will return up to the division corresponding to 1,5 time units or 45 minutes. The apparent mean speed after return to zero is given out by the hand as 6 kilometers for 45 minutes i. e. 8 kilometers per hour.

The scale is arranged for this small speed to appear to the user to be really the speed which should be given out before the car has started. The groove AC may obviously be replaced by a slope. More generally AC may be constituted by an independent auxiliary groove or slope which need not be an extension of the main groove.

The present invention is obviously adapted to numerous modifications; for instance the slider path may be not a circle but a straight line or any desired curve.

Similarly, the cam curves instead of being flat may be provided on a winding surface.

Such modifications may be adapted without widening the scope of the invention.

What we claim is:

1. A cam arrangement chiefly for operator machines comprising a rotary plate provided with main guiding means having parts where the guidance is defective, inefficient or indefinite, a main slider adapted to be guided by said means, an auxiliary slider, a common carrier for both sliders, a pivot for said carrier and means carried by the plate to one side of and in addition to the first mentioned guiding means for positively and continuously guiding the auxiliary slider in those parts which correspond to a defective, inefficient or indefinite guidance of the main slider.

2. A cam arrangement chiefly for operator machines comprising a rotary plate provided with main guiding means having parts where the guidance is defective inefficient or indefinite, a main slider adapted in succession to be guided by and to act on the guiding means, an auxiliary slider, a common carrier for both sliders, a pivot for said carrier and means carried by the plate to one side of and in addition to the first mentioned guiding means for positively and continuously guiding the auxiliary slider in those parts which correspond to a defective, inefficient or indefinite guidance of the main slider.

3. A cam arrangement chiefly for operator machines comprising a rotary plate provided with main guiding means extending from one edge to the diametrically opposed edge of the plate and showing parts where the guidance is defective, inefficient or indefinite, a main slider adapted to be guided by said means, an auxiliary slider, a common carrier for both sliders, a pivot for said carrier and means carried by the plate to one side of and in addition to the first mentioned guiding means for positively and continuously guiding the auxiliary slider in those parts which correspond to a defective, inefficient or indefinite guidance of the main slider.

4. A cam arrangement chiefly for operator machines comprising a rotary plate provided with main guiding means having parts where the guidance is defective, inefficient or indefinite, a main slider adapted to be guided by said means, an auxiliary slider rigidly connected therewith at a distance therefrom, means carried by the plate to one side of the corresponding position of the guiding means for guiding the auxiliary slider, and means carried by the cam for stopping the useful movement of the main slider at the end of its path.

5. In a cam arrangement for use with mean speed indicators as claimed in claim 1 the provision of auxiliary guiding means adapted to guide the slider when the cam is returned to zero.

6. In a cam arrangement for use with means speed indicators as claimed in claim 1 the provision of auxiliary guiding means adapted to guide the time slider when the cam is returned to zero and to bring it into a position corresponding to a well defined value of the time variable.

7. In a cam arrangement for use with mean speed indicators as claimed in claim 1 the provision of means for returning the main slider to a prior portion of its path when it has come to the end of said path.

8. A cam arrangement chiefly for operator machines comprising a rotary plate provided with main guiding means having parts where the guidance is defective, inefficient or indefinite, a main slider adapted to be guided by said means, an auxiliary slider, a strap passing over both sides of the plate and operatively carrying the sliders in front of said two sides respectively, a pivot for the strap and means carried by the plate on the side opposed to the first mentioned guiding means and to the side thereof for positively and continuously guiding the auxiliary slider in those parts which correspond to a defective, inefficient or indefinite guidance of the main slider.

9. A cam arrangement chiefly for operator machines comprising a rotary plate provided with a cam groove including intersecting windings, a main slider adapted to be guided by said groove, an auxiliary slider, a common carrier for both sliders, a pivot for the carrier and guiding means carried by the plate to the side of and in addition to the cam groove for positively and continuously guiding the auxiliary slider through the intersections of the cam groove.

10. A cam arrangement chiefly for operator machines comprising a rotary plate provided with main cam windings having parts where the guidance is defective, inefficient or indefinite, a main slider adapted to be guided by said cam windings, an auxiliary slider rigidly connected therewith at a distance therefrom, means carried by the plate to one side of the corresponding part of the main cam windings for guiding the auxiliary slider, and a stop raised on the plate for stopping the useful movement of the main slider at the end of its path along the cam windings.

11. A cam arrangement chiefly for operator machines comprising a rotary plate provided with main cam windings having parts where the guidance is defective, inefficient or indefinite, a main slider adapted to be guided by said cam windings, an auxiliary slider rigidly connected therewith at a distance therefrom, means carried by the plate to one side of the corresponding part of the main cam windings for guiding the auxiliary slider, and oblique guiding means connecting the end of the last main winding to the prior winding for returning the main slider to said prior winding of the end of its path.

HARRY PAUL GOVARE.
FRANÇOIS MARIE MICHEL
BERNARD SALOMON.